Aug. 16, 1932.   E. J. DILL   1,871,963
FLEXIBLE CONNECTER
Filed May 25, 1929

Inventor
Edward J. Dill
By Spencer Hardman & Fehr
his Attorneys

Patented Aug. 16, 1932

1,871,963

UNITED STATES PATENT OFFICE

EDWARD J. DILL, OF DAYTON, OHIO, ASSIGNOR TO THE INLAND MFG. CO., OF DAYTON, OHIO, A CORPORATION OF DELAWARE

FLEXIBLE CONNECTER

Application filed May 25, 1929. Serial No. 365,887.

This invention relates to connecters having non-metallic resilient material interposed between metal parts so as to isolate the connected members by said resilient non-metallic material.

The general object of this invention is to provide such a simple, efficient and economically made connecter especially adapted to be used in tension (that is as a suspension connecter) as a vibration absorbing support or mounting.

Another object is to provide such a resilient connecter having elastic rubber material retained under high compression by an outer casing, the rubber having such an initial distortion due to such compression that there will be little or no tendency for the rubber to bulge out further at an opening in said casing when the load is applied to said connecter.

Another object is to provide a resilient connecter adapted to be used as a suspension connecter wherein the outer metal casing substantially completely encloses the rubber, thereby providing a protective armor therefor.

Another object is to provide such a resilient connecter wherein the outer metal casing is permanently assembled upon the compressed soft rubber in such manner that applied tensile forces upon the connecter will have little tendency to change the shape of said casing.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 3:
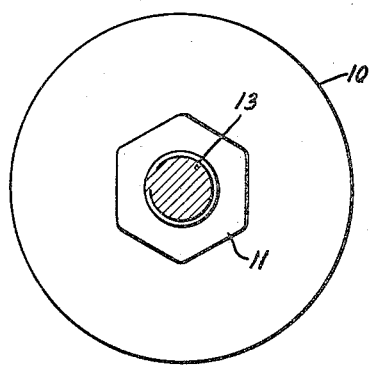
Fig. 3 is a top view thereof taken on line 3—3 of Fig. 1.

Numeral 10 designates the circular outer metal casing which is preferably pressed and drawn by suitable dies from a suitable deep-drawing flat sheet steel. The shape of casing 10 is clearly illustrated in Figs. 1, 2 and 3. It is thought the term "substantially tomato-shaped" describes the general shape of casing 10 as accurately as any term so far found. This term is not entirely satisfactory, however, due to the protrusion 11 on the top surface thereof which provides an inner recess 12 for head 9 of the upper attaching bolt 13. Casing 10 is rigidly fixed to the supporting member 15 by screwing nut 14 up tight, as is obvious from Fig. 1. Casing 10 encloses a metal head, designated as a whole by 20, which comprises a pressed metal flange member 21, a bolt head 22 of bolt 23, and a spacer sleeve 24, all rigidly fixed together by the tightening of nut 25 which also fixes head 20 to the supported member 16. Preferably flange member 21 has a recess 26 pressed therein which serves to seat bolt head 22 and prevent its relative rotation therein. Spacer sleeve 24 preferably has a flange 27 at its lower end which provides a larger seating area upon member 16 and also to some extent limits the outward bulging of the resilient rubber adjacent sleeve 24. Metal head 20 is completely enclosed and isolated from casing 10 by a block 30 of resilient non-metallic material, preferably resilient rubber of the desired softness to withstand the loads to be imposed upon the connecter without excessive distortion or flow. This soft rubber block 30 is held under high compression by the outer casing 10 whose lower peripheral portion 31 is curved inwardly and upwardly by suitable dies to some such position as shown in Fig. 1.

Figure 4:
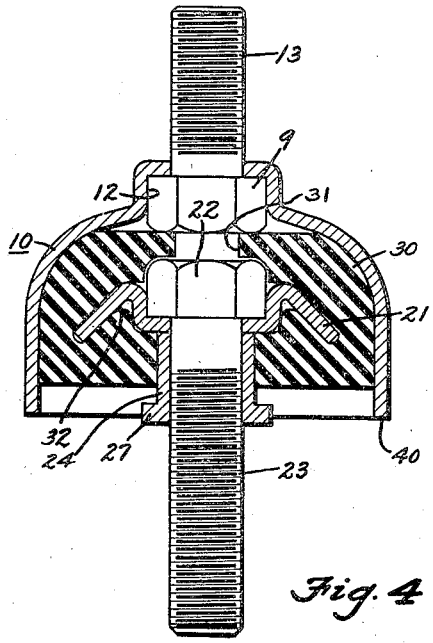
Fig. 4 illustrates a step in the manufacture and shows a vertical section through the connecter prior to the final step of deforming the outer metal casing to put the rubber block under high compression and to permanently assemble the parts together.
Figure 1:
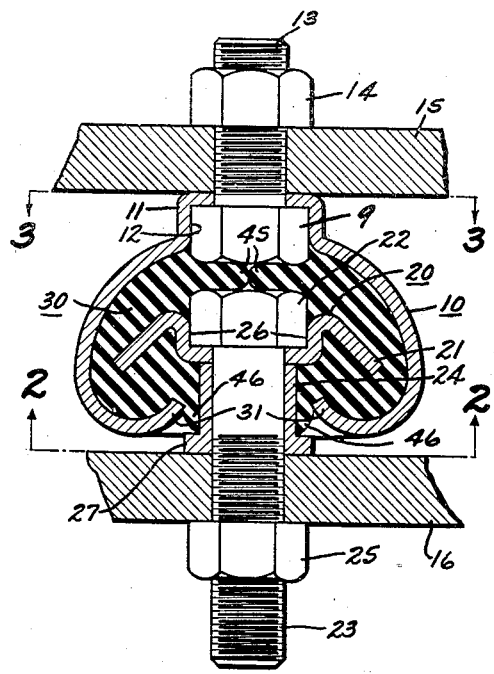
Fig. 1 is a vertical section through the center line of a resilient connecter made according to this invention and shows the connecter mounted as a suspension unit.
Figure 2:
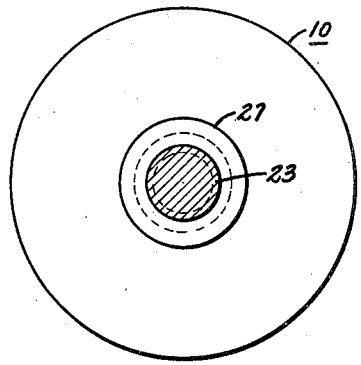
Fig. 2 is a bottom view of the connecter taken on line 2—2 of Fig. 1.

An important feature of this invention lies in the relative shapes of the original molded shape of the rubber block 30 (as shown in Fig. 4) and its final distorted shape as shown in Fig. 1. The soft rubber block is molded to the shape shown in Fig. 4 with the central aperture 31 therein and also the conical annular recess 32 within which the flange member 21 fits substantially. Flange member 21 may be first inserted within its recess 32 through the aperture 31 by distorting the soft rubber sufficiently to permit such insertion. The bolt 23 may be then easily inserted through the central aperture to the position shown in Fig. 4 and then the spacer sleeve 24 slipped upwardly from below to the position shown. The thus assembled parts 30, 21, 22, 23 and 24 are then set within the outer casing 10 while in cup form as shown in Fig. 4, the bolt 13 being of course first inserted in place in casing 10. The peripheral edges 40 of casing 10 are then closed in upon the rubber 30 by means of suitable dies to the position shown in Fig. 1, thereby highly compressing the rubber and causing it to flow and fill the unoccupied spaces within casing 10 substantially as shown in Fig. 1. The soft rubber will bulge inwardly as shown at 45 (Fig. 1) to substantially fill the space between bolt heads 9 and 22. In doing this the rubber fibers are not ruptured entirely, but are so tensioned that there is always a strong tendency for the rubber to return to its original molded form. Likewise the soft rubber will bulge outwardly at the points 46, when it is compressed by casing 10, but with a similar tendency to return within the casing due to the tension on the rubber fibers. It will now be clear that, due to this initial distortion of the rubber from its molded form, the rubber will inherently resist further distortion or variation in its shape (as shown in Fig. 1) from the applied load, whether this load is applied to put the connecter in tension or compression. When the connecter is put in tension the rubber is further compressed between the downwardly turned flange 21 and the upwardly turned peripheral portion 31 of casing 10, but this further compression will have little or no tendency to cause a further bulging out of rubber at the point 46. This connecter will also sustain compression loads without material distortion of the rubber and hence without danger of contact between the inner and outer metal parts. Obviously, due to the resiliency of the soft rubber 30, this connecter will permit a small universal angular movement between the connected parts 15 and 16, and during such angular movement the rubber will be so distorted that there will be little or no tendency to bulge out further at point 46 and will always return to its shape shown in Fig. 1 when the connected parts are brought back to their normal relative position. The casing 10 provides a substantially complete protective armor for the soft rubber 30 and there is no crevice where dirt or other foreign matter may enter and cause wear or rapid deterioration of the rubber. The rubber bulging downwardly at 46 prevents any possibility of the dirt finding lodgment or entering casing 10 at this opening.

While the form of embodiment of the present invention as herein disclosed, constitutes a preferred form, it is to be understood that other forms might be adopted, all coming within the scope of the claims which follow.

What is claimed is as follows:

1. A universally yieldable suspension connecter for connecting two members comprising: a metal casing having means for fixing to one of said members and having an opening therein surrounded by inwardly turned marginal portions, a metal head inserted within said casing, said head comprising a flaring flange member diverging in the direction of said opening and having a bolt-head receiving recess therein, and a bolt fixed to and extending through a central aperture in said flange and fixed to the other of said connected members, a resilient non-metallic block isolating said head and bolt from said casing and held under high compression by said casing at all times independently of the applied tension load.

2. A yieldable suspension connecter for connecting two members comprising: an approximately tomato-shaped metal casing fixed to one of said members and having an opening therein at its stem end, said casing having inwardly turned marginal portions adjacent said opening, a metal head diverging toward said opening and inserted within said casing and having a shank fixed thereto and projecting through said opening for attachment to the other of said connected members, and a resilient non-metallic block isolating said head and casing and held under high compression by said casing at all times independently of the applied tension load.

3. A universally yieldable connecter for connecting two members comprising: a metal casing having means for fixing to one of said members and having an opening therein surrounded by inwardly turned marginal portions, a metal head within said casing and having an outwardly flaring flange diverging toward said opening and having means for fixing to the other of said connected members, and a resilient non-metallic block isolating said head and casing and held under high initial compression by said casing.

In testimony whereof I hereto affix my signature.

EDWARD J. DILL.